United States Patent
Stief

(10) Patent No.: US 9,018,867 B2
(45) Date of Patent: Apr. 28, 2015

(54) GENERATOR DRIVE SYSTEM FOR AN INTERNAL COMBUSTION ENGINE

(75) Inventor: Hermann Stief, Emskirchen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 404 days.

(21) Appl. No.: 13/322,009

(22) PCT Filed: Jun. 15, 2010

(86) PCT No.: PCT/EP2010/058386
§ 371 (c)(1),
(2), (4) Date: Nov. 22, 2011

(87) PCT Pub. No.: WO2011/006724
PCT Pub. Date: Jan. 20, 2011

(65) Prior Publication Data
US 2012/0068651 A1 Mar. 22, 2012

(30) Foreign Application Priority Data

Jul. 17, 2009 (DE) .......................... 10 2009 033 633

(51) Int. Cl.
| | |
|---|---|
| *H02P 7/00* | (2006.01) |
| *F02N 15/02* | (2006.01) |
| *F02N 11/04* | (2006.01) |
| *F02N 15/00* | (2006.01) |
| *F02N 19/00* | (2010.01) |
| *B60W 10/30* | (2006.01) |
| *F02B 67/06* | (2006.01) |
| *F02N 11/08* | (2006.01) |

(52) U.S. Cl.
CPC .............. *F02N 15/023* (2013.01); *B60W 10/30* (2013.01); *F02B 67/06* (2013.01); *F02N 11/04* (2013.01); *F02N 11/0814* (2013.01); *F02N 15/006* (2013.01); *F02N 19/00* (2013.01)

(58) Field of Classification Search
USPC ........ 318/140, 146, 148, 152; 477/8, 13, 167; 322/13, 14
See application file for complete search history.

(56) References Cited

U.S. PATENT DOCUMENTS

| | | | | |
|---|---|---|---|---|
| 4,840,607 A | * | 6/1989 | Hitchcock et al. | 474/167 |
| 6,044,943 A | * | 4/2000 | Bytzek et al. | 192/41 R |
| 6,425,838 B1 | * | 7/2002 | Matsubara et al. | 475/5 |
| 6,858,094 B2 | * | 2/2005 | Qu et al. | 148/33.5 |
| 7,425,769 B2 | * | 9/2008 | Roh | 290/31 |
| 7,727,115 B2 | * | 6/2010 | Serkh | 477/115 |
| 2009/0298646 A1 | * | 12/2009 | Parsons | 477/167 |

FOREIGN PATENT DOCUMENTS

| | | |
|---|---|---|
| CN | 2764057 Y | 3/2006 |
| CN | 2846202 Y | 12/2006 |
| CN | 1981419 A | 6/2007 |
| CN | 101468602 A | 7/2009 |
| DE | 10225697 A1 | 2/2003 |
| DE | 10 2007 021 233 A1 | 11/2007 |
| EP | 1 085 183 A2 | 3/2001 |

* cited by examiner

*Primary Examiner* — Rina Duda
(74) *Attorney, Agent, or Firm* — Volpe and Koenig, P.C.

(57) ABSTRACT

A generator drive system for the generator (3) of an internal combustion engine (1), including a flexible drive having a traction mechanism (5) which is guided across a generator pulley (6) driving the generator (3). The generator (3) is configured and electrically wired such that the generator (3) can be temporarily driven as a motor, and the generator (3) is coupled to the generator pulley (6) or the crankshaft pulley (7) is coupled to the crankshaft (8) via an overrunning clutch (4) which allows the generator (3), when operated as a motor, running faster than the generator pulley (6) or, taking into consideration a gear ratio, the crankshaft (8).

8 Claims, 2 Drawing Sheets

GENERATOR DRIVE SYSTEM FOR AN INTERNAL COMBUSTION ENGINE

FIELD OF THE INVENTION

The invention relates to a generator drive system for driving the generator of an internal combustion engine as well as perhaps additional secondary aggregates of said internal combustion engine. Furthermore, the invention also relates to a method for synchronizing the operation of the generator of an internal combustion engine.

BACKGROUND OF THE INVENTION

Generator drive systems of the above-mentioned type typically comprise a traction transmission drive. Presently, primarily flat belts and/or v-ribbed belts are used as traction transmissions, for example so-called poly-v-belts. These belts are pre-stressed via tensioning pulleys. Particularly when starting the internal combustion engine, during the first rotations of the crankshaft, stress can occur within the traction mechanism far exceeding the stress occurring during the regular operation. Particularly in vehicles equipped with automatic motor start-up and shut-down devices, the motor starting processes considerably affect the life of the components of said traction mechanism and the aggregates driven.

SUMMARY

The objective of the invention is to provide solutions by which it is possible to reduce stress occurring inside a drive system ("FEAD") provided for driving a generator, particularly within the scope of motor starting processes.

The above-mentioned objective is attained according to the invention by a generator drive system for the generator of an internal combustion engine having a flexible drive comprising a traction mechanism guided across a generator pulley serving to drive the generator, with this drive system being characterized in that the generator is embodied and electrically switched to allow the generator to temporarily operate as a motor and that the generator is coupled to the generator pulley or the crankshaft pulley of the internal combustion engine via an overrunning clutch, which allows within the scope of operating as a motor that the generator is able to run faster than the generator pulley or the crankshaft, considering a gear ratio.

This way it is advantageously possible to reduce the generator load at selected operating conditions, particularly during the start-up phase of the motor as well as in phases with high increase of the angular velocity of the crankshaft of the internal combustion engine, the power output via the pulleys, as well as the stress upon the traction mechanism presently caused by the inertia of the generator.

According to a particularly preferred embodiment of the invention, the overrunning clutch is embodied as a clamp body-pulley. This overrunning clutch allows, without any additional exterior influence, for the generator operating as the motor to run faster. Furthermore it is also possible to embody the overrunning clutch as a spring-loaded clamp freewheel, or perhaps also as an actively switchable freewheel.

The switching of the generator into a coast-load mode occurs according to the invention depending on the operating state of the internal combustion engine or the respective motor vehicle. In particular, the switching of the generator into a motor operation occurs within the scope of a motor start-up phase so that the starter is not required to accelerate the rotary supported and inertia-afflicted components of the generator.

Based on the concept according to the invention advantageously a considerable reduction of the effective overall motor-mass moment of inertia is achieved. Additionally, using this concept in other operation phases a considerable reduction of the effective FEAD-inertias can also be achieved, particularly in phases of distinct increases of rotation. To the extent the internal combustion engine can achieve rotations in the range of resonance frequencies of the flexible drive, the stress occurring in the flexible drive in these ranges can also be reduced by a temporary coast-load operation.

Using the concept according to the invention it is possible to reduce the pre-stressing of the belt set in the flexible drive and thus to reduce the stress of the components in the flexible drive. This way, even with cost-effective components, long life-spans can be achieved reliably. In particular, comprehensive and expensive parts (e.g., high-stress tensioners, special belts, and the like) can be avoided in FEAD.

The generator is preferably designed such that it can accelerate its running structure as well as the components rotating with them with sufficient dynamics (preferably at least slightly faster than the fastest accelerations of the motor under normal operating conditions).

By the control or regulation according to the invention the engine control unit (ECU), preferably connected therewith, can then achieve the following:

1. The generator (=e-motor) accelerates even during the start-up of the motor (thus no power tap by the crankshaft)—this then "only needs to accelerate the generator disk and prorated the overrunning clutch 1". The invention also comprises concepts, in which a overrunning clutch-system is arranged in the crankshaft belt disk. When the generator is designed appropriately powerful it is possible thereby to bring the entire belt drive to rotations preventing any power tap on the crankshaft.
2. In case of rapid changes of rotation, even towards high rotations, the generator can even accelerate such that the rotation of the generator shaft in these short periods of time always slightly exceeds the rotation of the generator belt disk.
3. In start-up processes the generator accelerates its own operation (freewheel at the generator) and/or the belt drive (override on the crankshaft). During start-up, the belt drive with its tensioning systems and potentially present decoupling elements passes resonance ranges, which may lead to high stress peaks. These resonance ranges may be passed by the concept according to the invention without any power tap on the crankshaft, without here any distinct coupling to the crankshaft system being given. This way, the start-up time is shortened. In particular when an automatic start-stop is used, the concept according to the invention proves particularly valuable.
4. In critical operating conditions (e.g., high cyclic irregularities by full motor load at extremely low rotation) the rotation of the generator can be actively increased, at least slightly above the rotation of the disk.
5. When a respective overrunning clutch is arranged on the crankshaft, the generator is designed such that it provides a drive moment in the coast-load operation, which is so heavy that here other aggregates of the FEAD can also be accelerated and thus the disk located on the crankshaft always rotates slightly faster than the crankshaft rotation in the above-mentioned critical operating states. This allows acceleration of the FEAD considerably more evenly. By this concept, the interfering accelerations, caused by combustion processes, are then eliminated particularly when the angular velocity adjusted by the coast-load operation of the generator is above the peak angular velocities increased by the cyclic irregularities (e.g., crankshaft rotation 1500+/−400 rotations per minute (rpm) then rotation belt drive 1900+x (approx. 2000 rpm)).

6. When the critical operating state is over, the generator rotation (and/or the one of the e-motor) can be lowered to the crankshaft rotation * gear ratio and the generator then is driven via the flexible drive and here operating again in the generator mode, i.e. emitting electric power).

7. The charging periods occurring within the scope of the coast-load operation or motor operation of the generator are relatively short. It is possible to adjust the application of the concept according to the invention depending on the charge status of a battery. The temporary coast-load operation of the generator suggested according to the invention can be prevented when the charge status of the battery system renders it advisable.

8. The freewheels can be embodied as purely mechanical components, allowing the faster running operation. These freewheels can particularly be embodied as clamp body—overrunning clutches with ramps at the interior ring or at the exterior ring, as well as wrap-spring freewheels.

9. According to another aspect of the present invention the e-motor, operated both in the generator mote as well as in the motor or coast-load operating mode, can also be used as an engine brake for a regenerative braking via the belt drive. The electric power generated here can be buffered in rapid energy storage media (batteries, condenser systems, e.g., gold or supercaps). The energy generated here can then be used for the above-mentioned particular operating conditions.

10. When at higher accelerations of the vehicle simultaneously the belt drive/generator is uncoupled, as described above, more mechanic power is available for driving the vehicle. This leads to a higher elasticity during acceleration, and/or a reserve is available. If applicable, by the additional peak power yielded according to the invention respectively smaller sized motors can be used.

BRIEF DESCRIPTION OF THE DRAWINGS

Additional details and features of the invention are discernible from the following description in connection with the drawing. Shown are.

DETAILED DESCRIPTION OF THE PREFERRED EMBODIMENTS

Figure 1:
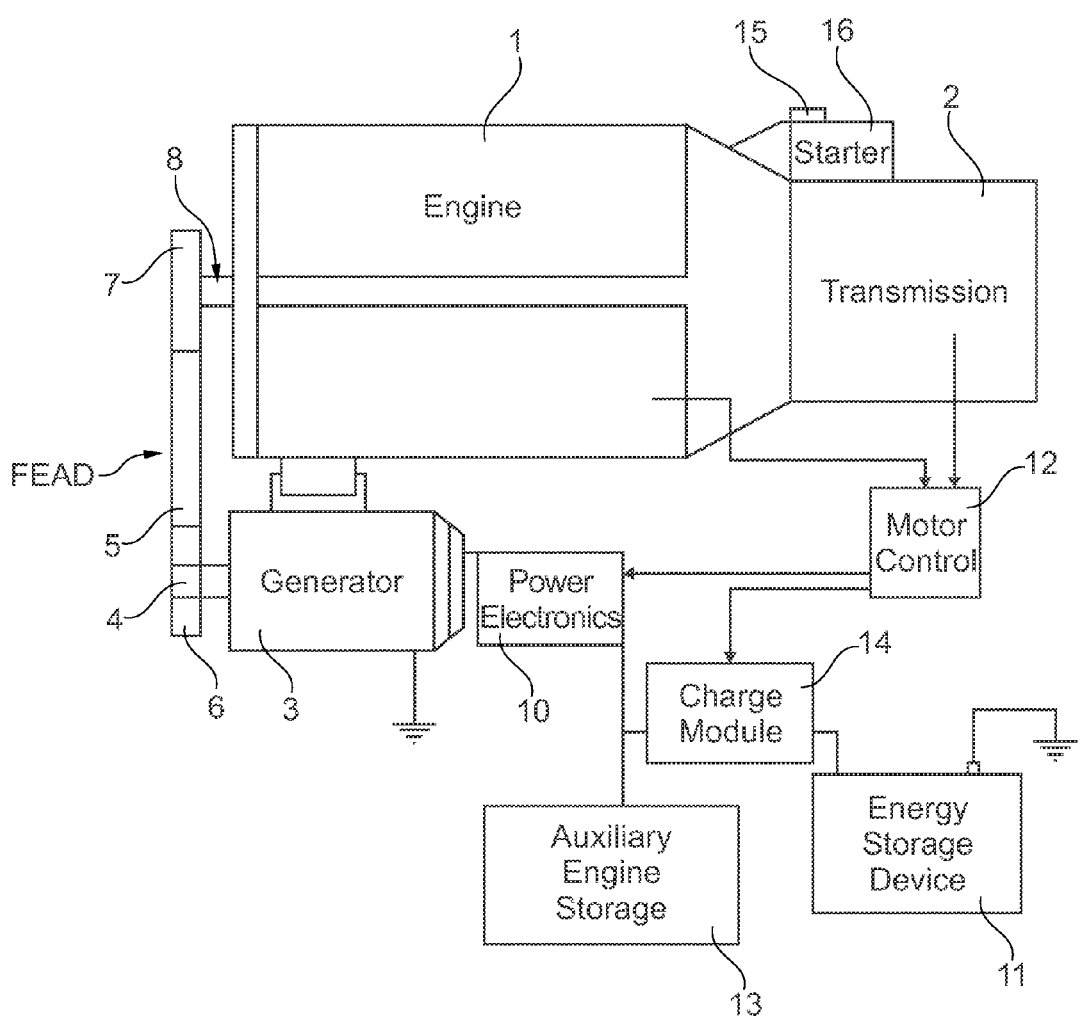
FIG. 1 a sketch illustrating the principle of the concept according to the invention in connection with a drive system provided for driving a motor vehicle.

FIG. 1 shows, in a strongly simplified manner, a drive system for a passenger vehicle. This drive system comprises an internal combustion engine 1, a transmission 2 connected thereto for allowing the power tap required for driving a motor vehicle, as well as a generator drive system (FEAD) for driving a generator 3 and perhaps additional secondary aggregates (not shown here).

The generator drive system comprises a flexible drive with a traction mechanism 5, which is guided via a generator pulley 6, serving to drive the generator 3 and/or the kinematic implementation thereof into the flexible drive. The flexible drive further comprises a crankshaft pulley 7 located on the end section of the crankshaft 8 of the internal combustion engine 1.

The generator drive system shown here is characterized in that the generator 3 is embodied and electrically switched such that the generator 3 can temporarily be operated as an e-motor, with the generator 3 being coupled via an overrunning clutch 4 to the generator belt pulley 6, allowing that the generator 3 within the scope of the operating mode as a motor to run faster with regard to rotation than the generator pulley 6, i.e. rotates faster than the generator belt pulley 6.

In order to allow this particular operation of the generator 3 it is connected via power electronics 10 to the energy storage device 11. The control of the power electronics 10 occurs via the motor control 12. The control-relevant sensor signals for the operating status of the internal combustion engine and the vehicle equipped therewith are available to this motor control 12. Depending on the predetermined control strategies, a control of the power electronics 10 occurs via the motor control such that the rotor of the generator 3 reaches an angular velocity higher than the actual angular velocity of the generator belt pulley 6. In these particular operating phases of the generator 3 the mass inertia of the rotor as well as the generator shaft supporting it lead to no power tap on the flexible drive. In this operating mode, the generator 3 is ultimately uncoupled from the flexible drive.

It is possible to provide an auxiliary energy storage 13 for the temporary operation of the generator 3 with an electrically accelerated rotor shaft. This auxiliary energy storage 13 may be designed such that its charge is only sized for a few generator acceleration processes. If this auxiliary energy storage 13 has sufficient charge it is primarily used for providing the acceleration energy. By a charge module 14, also controlled by the motor control 12, it can further be determined from which of the storage systems 11, 13 the temporarily required energy shall be taken. Furthermore, in cooperation with the charge module 14, it may also be determined where the power generated within the scope of the future operation of the generator shall actually be supplied to. The alternative energy storage 13 can here be designed such that it allows extremely high charge currents. For this purpose, the auxiliary storage 13 may be embodied for example as a gold or supercap condenser system. The auxiliary storage 13 is therefore particularly suitable to accept electric power in a so-called regenerative operating mode, i.e. an operating mode in which the generator 3 taps power from the crankshaft 8 "pushed" via the transmission 2.

The system according to the invention can be provided as an internally adjusted group of components, which comprises a separate electronic control and perhaps also an auxiliary energy storage 13 for the particular generator. The signals required for the temporary operation of the generator 3 as a self-accelerating system may be provided as simple 1/0 signals via the magnetic switch 15 of the starter 16 or the motor electronic 12. An impulse generator system may be provided at the belt pulley 6 itself by which directly information concerning the rotation is provided in the area of the generator, allowing control of a faster-running operation of the rotor of the generator.

It is possible to design the generator and the electric systems allocated thereto such that for processing a motor start-up, the rotor of the generator is set into rotation with an angular acceleration, which ensures with sufficient safety a faster rotation of the rotor without here the rotation of the crankshaft or the rotation of the generator pulley 6 must be particularly detected, i.e. no additional control or regulation is necessary.

Figure 2:
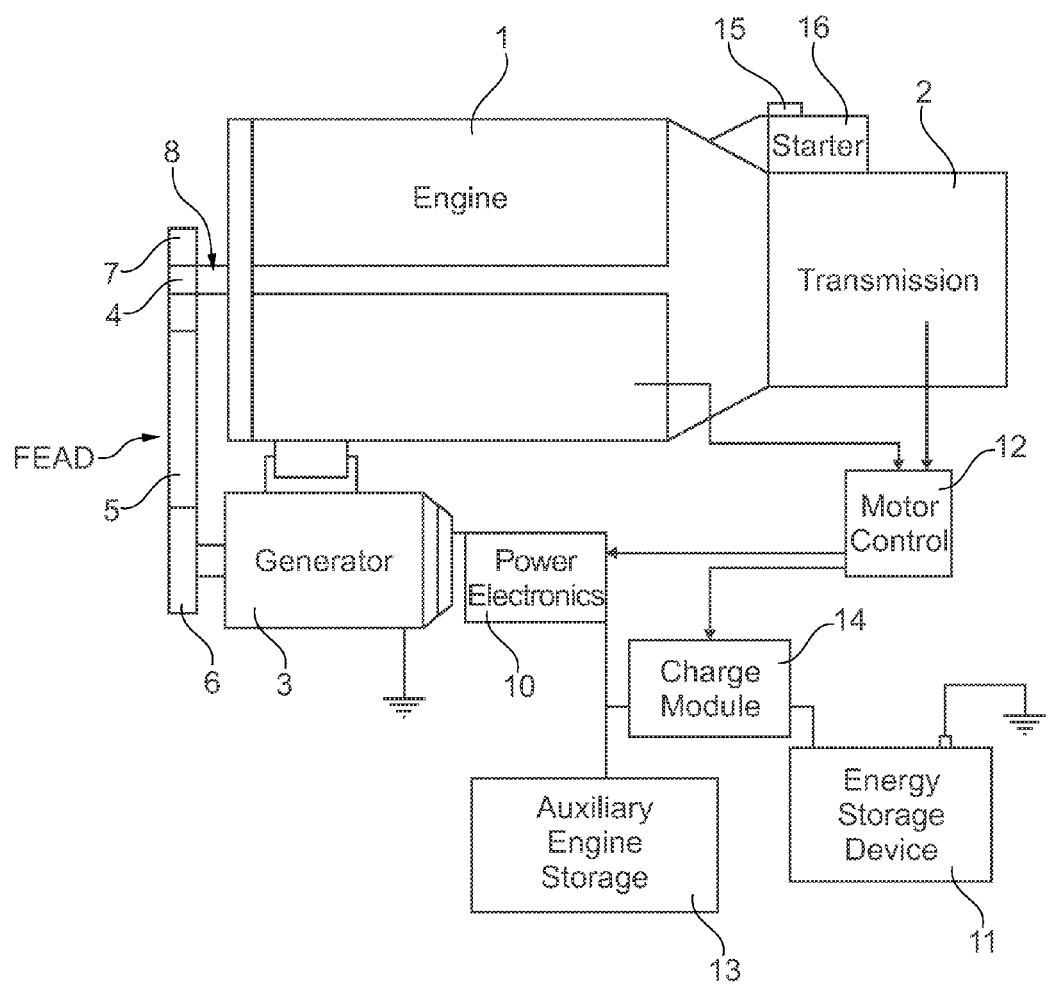
FIG. 2 shows another embodiment of a drive system provided for driving a motor vehicle.

The above-stated explanations are made for an embodiment in which the overrunning clutch 4 is arranged between the generator belt pulley 6 and the generator shaft. However, as shown in FIG. 2, the invention explicitly also includes such embodiments in which the overrunning clutch 4 is arranged between the crankshaft 8 and the crankshaft belt pulley 7. Via the generator 3, which particularly can be operated temporarily as a motor, the entire flexible drive including the crankshaft pulley placed on the crankshaft 8 can be preliminarily accelerated. This particular concept allows, via the generator 3, briefly driving auxiliary aggregates, such as a power-steering pump, so that the power steering function is given even when the internal combustion engine is shut off. By the overrunning clutch being located on the crankshaft, any entraining thereof is prevented.

The power electronics 10 is preferably embodied such that it can process both the generator operation as well as the temporary motor operation.

LIST OF REFERENCE CHARACTERS

1 Internal combustion engine
2 Transmission
3 Generator
4 Overrunning clutch
5 Flexible drive
6 Generator pulley
7 Crankshaft pulley
8 Crankshaft
10 Power electronics
11 Energy storage device
12 Motor control
13 Auxiliary energy storage
14 Charge module
15 Magnetic switch
16 Starter

The invention claimed is:

1. A generator drive system for a generator of an internal combustion engine, the generator drive system comprises a flexible drive comprising a traction mechanism, which is guided via a generator pulley serving to drive the generator, wherein the generator is embodied and electrically switched such that the generator can temporarily be operated as a motor and the generator is coupled to the generator pulley and a motor crankshaft pulley via an overrunning clutch arranged between the crankshaft and the motor crankshaft pulley, allowing the generator to overrun the crankshaft within the scope of the motor operation to allow the generator to run faster than the crankshaft.

2. A generator drive system according to claim 1, wherein the overrunning clutch comprises a clamp body-freewheel.

3. A generator drive system according to claim 1, wherein the overrunning clutch comprises a clamp spring-freewheel.

4. A generator drive system according to claim 1, wherein the overrunning clutch comprises a switchable freewheel.

5. A generator drive system according to claim 1, wherein a switching of the generator into a coast-load operation occurs depending on an operating status of the internal combustion engine or the respective motor vehicle.

6. A generator drive system according to claim 5, wherein the switching of the generator into the coast-load operation occurs within the scope of a motor start-up phase.

7. A method for operating a generator connected to an internal combustion engine via a flexible drive and an overrunning clutch system, comprising arranging an overrunning clutch between a crankshaft and a motor crankshaft pulley, depending on a motor operating status electrically controlling the generator such that the generator temporarily operates as a motor, accelerating a rotor of the generator operating as the motor such that the generator essentially taps no mechanical acceleration work from the flexible drive, and allowing the generator to overrun the crankshaft while the generator is in a motor operation to allow the generator to run faster than the crankshaft.

8. A method according to claim 7, wherein the rotor of the generator is accelerated such that the overrunning clutch system unlocks.

* * * * *